(12) United States Patent
Hanley (10) Patent No.: US 11,919,483 B2
(45) Date of Patent: Mar. 5, 2024

(54) SHELVING SYSTEMS (71) Applicant: DEJANA TRUCK & UTILITY EQUIPMENT COMPANY, LLC, Kings Park, NY (US)

(72) Inventor: Charles L. Hanley, Woonsocket, RI (US)

(73) Assignee: Dejana Truck & Utility Equipment Co. Inc., Kings Park, NY (US)

( * ) Notice: Subject to any disclaimer, the term of this patent is extended or adjusted under 35 U.S.C. 154(b) by 0 days.

(21) Appl. No.: 18/114,397

(22) Filed: Feb. 27, 2023

(65) Prior Publication Data

US 2023/0226983 A1    Jul. 20, 2023

Related U.S. Application Data (63) Continuation of application No. 17/157,347, filed on Jan. 25, 2021, now Pat. No. 11,608,006, which is a
(Continued)

(51) Int. Cl.
*B60R 7/08* (2006.01)
*A47B 95/02* (2006.01)
(Continued)

(52) U.S. Cl.
CPC ............... *B60R 7/08* (2013.01); *A47B 95/02* (2013.01); *A47B 96/07* (2013.01); *B60P 3/007* (2013.01);
(Continued)

(58) Field of Classification Search
CPC .. B60R 7/08; B60R 7/04; B60R 11/00; B60R 2011/0003; A47B 95/02; B60P 3/007
See application file for complete search history.

(56) References Cited

U.S. PATENT DOCUMENTS

| 4,379,603 A | * | 4/1983 | Johnson | A47B 95/02 16/415 |
| 2008/0150407 A1 | * | 6/2008 | Mehmen | E05B 65/46 29/428 |

(Continued)

FOREIGN PATENT DOCUMENTS

| EP | 613641 A1 * | 9/1994 | ............. A47B 95/02 |
| WO | WO-2007031351 A1 * | 3/2007 | ............... B60R 7/04 |
| WO | WO-2011128734 A1 * | 10/2011 | ......... A47B 88/0014 |

*Primary Examiner* — Lori Lyjak
(74) *Attorney, Agent, or Firm* — Sorell, Lenna & Schmidt, LLP (57) ABSTRACT

A shelving system includes side members that each define a first channel having a slide disposed therein. A cross member extends between and connects the slides. The cross member defines a second channel having a guide member disposed therein. The guide member defines a third channel and a flange. A container includes side walls having a rail. One of the rails is movably disposed in the third channel. The rails include a first locking element and a second locking element. The handle includes a third locking element that engages the first locking element. The handle is movable between a first position in which the second locking element engages the flange and the container is fixed relative to the guide member and a second position in which the second locking element is spaced apart from the flange and the container can translate relative to the guide member.

20 Claims, 10 Drawing Sheets

Related U.S. Application Data continuation of application No. 16/036,213, filed on Jul. 16, 2018, now Pat. No. 10,913,398, which is a continuation of application No. 15/887,154, filed on Feb. 2, 2018, now Pat. No. 10,106,094, which is a continuation of application No. 15/798,880, filed on Oct. 31, 2017, now Pat. No. 10,703,292, which is a continuation of application No. 15/181,968, filed on Jun. 14, 2016, now Pat. No. 9,834,149, which is a continuation of application No. 14/640,214, filed on Mar. 6, 2015, now Pat. No. 9,381,872, which is a continuation of application No. 13/909,185, filed on Jun. 4, 2013, now Pat. No. 9,010,830.

(51) Int. Cl.
    *A47B 96/07*     (2006.01)
    *B60P 3/00*     (2006.01)
    *B60R 7/04*     (2006.01)
    *B60R 11/00*     (2006.01)

(52) U.S. Cl.
    CPC ................ *B60R 7/04* (2013.01); *B60R 11/00* (2013.01); *B60R 2011/0003* (2013.01)

(56) References Cited

U.S. PATENT DOCUMENTS

| | | | | |
|---|---|---|---|---|
| 2010/0019636 A1* | 1/2010 | Chen | ...................... | E05B 65/46 |
| | | | | 312/332.1 |
| 2010/0168920 A1* | 7/2010 | Hooker | ................. | F25D 25/025 |
| | | | | 62/449 |
| 2011/0169389 A1* | 7/2011 | Jeffries | .................. | A47B 95/02 |
| | | | | 292/336.3 |
| 2018/0279781 A1* | 10/2018 | Jeffries | .................. | E05B 65/46 |
| 2020/0054133 A1* | 2/2020 | Jeffries | ................. | B21C 23/142 |
| 2021/0244185 A1* | 8/2021 | Jeffries | ................. | E05B 65/46 |
| 2022/0386774 A1* | 12/2022 | Jeffries | ................. | B21C 23/142 |

* cited by examiner

FIG. 13

SHELVING SYSTEMS

CROSS REFERENCE TO RELATED APPLICATIONS

This application is a continuation of U.S. patent application Ser. No. 17/157,347, filed Jan. 25, 2021, which is a continuation of U.S. patent application Ser. No. 16/036,213, filed Jul. 16, 2018, now U.S. Pat. No. 10,913,398, which is a continuation of U.S. patent application Ser. No. 15/887,154, filed Feb. 2, 2018, now U.S. Pat. No. 10,106,094, which is a continuation of U.S. patent application Ser. No. 15/798,880, filed Oct. 31, 2017, now U.S. Pat. No. 10,703,292, which is a continuation of U.S. patent application Ser. No. 15/181,968, filed Jun. 14, 2016, now U.S. Pat. No. 9,834,149, which is a continuation of U.S. patent application Ser. No. 14/640,214, filed Mar. 6, 2015, now U.S. Pat. No. 9,381,872, which is a continuation of U.S. patent application Ser. No. 13/909,185, filed on Jun. 4, 2013, now U.S. Pat. No. 9,010,830. These applications are incorporated herein by reference, in their entireties.

TECHNICAL FIELD

The present disclosure generally relates to shelves used to store items such as, for example, parcels and/or packages, and more particularly to a shelving system for temporarily storing items, wherein the shelving system is adapted to fit in a vehicle and can be adjusted depending upon the size and shape of the items being stored.

BACKGROUND

Delivery and/or service vehicles such as, for example, trucks, vans and cars may include an assembly having trays positioned on one or more racks located in an interior of the delivery or service vehicle. Items such as, for example, tools, parcels and/or packages are stored on the trays temporarily while the vehicle is being driven to a selected destination, such as, for example, the home or office of a client or a loading dock or storefront of recipient. A driver of the vehicle or other personnel may remove the item or items from the tray once he or she arrives at the selected destination by accessing the item or items through one or more doors of the vehicle, such as, for example, rear doors of a van or truck. Some vehicles include trays that slide relative to the rack to facilitate accessing the item or items by the driver of the vehicle or other personnel. That is, once one or more doors of the vehicle are opened, the driver or other personnel may slide the trays relative to the rack such that the item or items are conveniently located outside of the interior of the vehicle.

Spacing between adjacent trays is typically pre-determined according to the configuration of the rack, which typically includes equally spaced slot or other means configured to engage a tray such that the trays are equally spaced up and down the rack. Spacing between adjacent trays may therefore be inadequate to accommodate large items or, alternatively, may be greater than necessary when relatively small items are positioned on one of the trays. While some conventional rack and tray assemblies included in vehicles may increase the spacing between adjacent trays by removing one or more trays to accommodate large items, such assemblies lack a means to reduce the spacing between adjacent trays or increase the spacing between adjacent trays without removing one or more of the trays. As a result, the spacing between adjacent trays is often predetermined according to the design of the rack, rather than the size and shape of the item or items placed on the tray. That is, spacing between adjacent trays cannot be modified according to characteristics of the items placed on the trays, but is instead determined by the configuration of the rack and tray. This disclosure describes an improvement over these prior art technologies.

Furthermore, in vehicles that include trays that slide relative to the rack, the trays tend to slide at undesired times such as, for example, when the delivery vehicle makes a sharp turn and/or when the vehicle comes to an abrupt stop, which causes the item or items positioned on the tray to move relative to the tray and/or fall off the tray and onto the floor of the vehicle, potentially damaging the item or items. While some rack and tray assemblies used in vehicles include a locking mechanism to prevent the trays for sliding relative to the rack, the locking mechanisms used encompass only a small portion of the tray, thus making accessing the locking mechanism difficult and/or may require two hands to operate. For example, conventional locking mechanisms include a handle having a thumb release on one side of the handle. In order to lock and/or unlock the tray from the rack, the driver of the vehicle or other personnel is required to apply the thumb release, typically by pressing the thumb release down. Due to the small size and remote location of the thumb release, accessing and/or pressing the thumb release is often difficult, especially when the driver or other personnel is carrying other items. This disclosure describes an improvement over these prior art technologies.

Still further, trays of conventional rack and tray assemblies used in vehicles often include handles of a relatively weak construction that tend to bend or break when the driver of the delivery or service vehicle or other personnel pulls on the handle. The handles also tend to have a common appearance as they are not specifically tailored to the particular rack and tray assembly according to, for example, a locking mechanism used to lock and unlock the trays to prevent trays from moving relative to the rack undesirably. This disclosure describes an improvement over these prior art technologies.

SUMMARY

In one embodiment, a shelving system is provided. The shelving system includes first and second side members each extending along an axis between a first end and a second end. The side members each include an inner surface defining a first channel. A slide is movably disposed in each of the first channels. A cross member extends between and connects the slides. The cross member includes an inner surface defining a second channel. A guide member is movably disposed in the second channel. The guide member includes an inner surface defining a third channel and at least one flange. A container includes a first wall and a second wall extending parallel to the first wall. The container further includes a pair of spaced apart side walls extending between the first and second walls. The side walls each comprise a rail. One of the rails is movably disposed in the third channel. At least one of the rails includes a first locking element and a second locking element connected to the first locking element by a cable. The first wall includes a handle comprising a third locking element that engages a first end of the first locking element. The handle is movable between a first position in which a first end of the second locking element engages the flange and the container is fixed relative to the guide member and a second position in which the first end of the second locking element is spaced apart from the flange and the container can translate relative to the guide member. In some embodiments, methods are provided.

In one embodiment, the shelving system comprises a vehicle having an interior including a floor and a ceiling. The interior of the vehicle is accessible though at least one side door. First and second side members are positioned in the interior of the vehicle such that the side members are spaced apart from side walls of the vehicle. The side members each extend along an axis between a first end and a second end and each include an inner surface defining a first channel. A slide is movably disposed in each of the first channels. An upper member extends between and connects the first ends of the side members. The upper member extends perpendicular to the axes. The upper member engages the ceiling of the vehicle and includes an aperture extending parallel to the axes. The upper member has a fastener extending through the aperture and into the ceiling to fix the upper member relative to the ceiling of the vehicle. A lower member extends between and connects the second ends of the side members. The lower member engages the floor of the vehicle and includes an aperture extending parallel to the axes. The lower member has a fastener extending through the aperture in the lower member and into the floor to fix the lower member relative to the floor of the vehicle. A cross member extends between and connects the slides. The cross member includes an inner surface defining a second channel extending perpendicular to the axes. A guide member is movably disposed in the second channel. The guide member includes an inner surface defining a third channel. The guide member further includes at least one flange. A container includes a first wall and a second wall extending parallel to the first wall. The container includes a pair of spaced apart side walls extending between the first and second walls to define a square or rectangular container. The side walls of the container each include a rail projecting outwardly from a respective side wall. One of the rails is movably disposed in the third channel. The rail disposed in the third channel includes a first locking element and a second locking element connected to the first locking element by a cable. The first wall includes a handle comprising a third locking element that engages a first end of the first locking element. The handle is movable between a first position in which a first end of the second locking element engages the flange and the container is fixed relative to the guide member and a second position in which the first end of the second locking element is spaced apart from the flange and the container can translate relative to the guide member.

In one embodiment, the shelving system comprises a vehicle having an interior including a floor and first and second side walls. The interior of the vehicle is accessible through at least one rear door. First and second side members engage the first side wall of the vehicle. The side members each extend along an axis between a first end and a second end. The side members each include an inner surface defining a first channel. A slide is movably disposed in each of the first channels. An upper member extends between and connects the first ends. The upper member includes a bracket having a first surface extending perpendicular to the axes and a second surface disposed at an acute angle relative to the first surface. The second surface of the bracket engages the first side wall. The second surface of the bracket includes an aperture having a fastener extending through the aperture and into the first side wall to fix the upper member with the first side wall. A lower member extends between and connects the second ends. The lower member engages the floor and includes an aperture extending parallel to the axes. The lower member has a fastener extending through the aperture in the lower member and into the floor to fix the lower member relative to the floor. A cross member extends between and connects the slides. The cross member includes an inner surface defining a second channel extending perpendicular to the axes. A guide member is movably disposed in the second channel. The guide member includes an inner surface defining a third channel and at least one flange. A container includes a first wall and a second wall extending parallel to the first wall. The container includes a pair of spaced apart side walls extending between the first and second walls. The side walls of the container each include a rail projecting from a respective side wall. One of the rails is movably disposed in the third channel. At least one of the rails includes a first locking element and a second locking element connected to the first locking element by a cable. The first wall includes a handle comprising a third locking element that engages a first end of the first locking element. The cross member includes spaced apart openings. Each of the openings in the cross member is aligned with an aperture in one of the slides. A fastener extends through a respective opening in the cross member and a respective aperture in one of the slides to fix the cross member with the slides such that the fasteners are moveable between a first position in which an outer surface of the cross member is spaced apart from outer surfaces of the side members and the slides can translate axially within the first channels and a second position in which the outer surface of the cross member engages the outer surfaces of the side members and the slides are fixed relative to the side members. The handle is movable between a first position in which a first end of the second locking element engages the flange and the container is fixed relative to the cross member and a second position in which the first end of the second locking element is spaced apart from the flange and the container can translate relative to the cross member.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

The exemplary embodiments of a shelving system and related methods of use are discussed in terms of devices for the storage of items during transport. The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of a shelving system, related components and methods of employing the shelving system in accordance with the principles of the present disclosure. Alternate embodiments are also disclosed. Reference will now be made in detail to the exemplary embodiments of the present disclosure, which are illustrated in the accompanying figures. Turning to FIGS. 1-12, there are illustrated components of a shelving system 20.

In some embodiments, system 20 is configured for mounting in a vehicle, such as, for example, a delivery or service vehicle, such as, for example, a van or truck. In some embodiments, system 20 is mounted in the vehicle such that system 20 is accessible through rear doors of the vehicle, but is not readily accessible through side doors, or any other doors of the vehicle. In such embodiments, system 20 is positioned such that system 20 may move from a closed position to an open position when the rear doors of the vehicle open, but is prevented from moving from the closed position to the open position when the rear doors are closed, as will be described. In some embodiments, system 20 is mounted in the vehicle such that system 20 is accessible through one or more side door of the vehicle, but is not readily accessible through rear doors, or any other doors of the vehicle. In such embodiments, system 20 is positioned such that system 20 may move from the closed position to the open position when the side door of the vehicle is open, but is prevented from moving from the closed position to the open position when the side door is closed, as will be described. In some embodiments, system 20 includes a plurality of shelving units, wherein one unit is mounted in the vehicle such that it is accessible through one or more side doors on a first side of the vehicle and another unit is mounted in the vehicle such that it is accessible through one or more side doors on an opposite second side of the vehicle. In some embodiments, system 20 includes the vehicle.

The components of shelving system 20 can be fabricated from materials including metals, polymers and/or composites, depending on the particular application. For example, the components of system 20, individually or collectively, can be fabricated from materials such as aluminum, steel, iron, stainless steel, titanium, titanium alloys, cobalt-chrome, stainless steel alloys, semi-rigid and rigid materials, plastics, elastomers, rubbers and/or rigid polymers. Various components of system 20 may have material composites, including the above materials, to achieve various desired characteristics such as strength, rigidity, elasticity, performance and durability. The components of system 20, individually or collectively, may also be fabricated from a heterogeneous material such as a combination of two or more of the above-described materials. The components of system 20 can be extruded, molded, injection molded, cast, pressed and/or machined. The components of system 20 may be monolithically formed, integrally connected or include fastening elements and/or instruments, as described herein.

System 20 includes a frame comprising a first pair of side members 22 opposite a second pair of side members 22. Side members 22 each extend along a longitudinal axis L between a first end 24 and a second end 26. Side members 22 have a length defined by the distance between ends 24, 26. Side members 22 have a uniform width or diameter along the entire length of each side member 22. Side members 22 each include an inner surface 28 defining a first channel 30. First channels 30 each extend the entire length of each side member 22. Inner surfaces 28 of the first pair of side members 22 face inner surfaces of the second pair of side members 22. In some embodiments, side members 22 and/or first channel 30 may have various cross section configurations, such as, for example, oval, oblong, triangular, rectangular, square, polygonal, irregular, uniform, non-uniform, variable, tubular and/or tapered, depending upon the requirements of a particular application. In some embodiments, each first channel 30 is capped on either ends thereof such that each first channel 30 has a length that is less than the length of a respective side member 22 to prevent a drawer slide, such as, for example, a slide 42 disposed in first channel 30 from moving out of first channel 30.

Side members 22 each include a planar first wall 32 extending between parallel planar side walls 34. First walls 32 of the first pair of side members 22 are aligned with one another and first walls 32 of the second pair of side members 22 are aligned with one another. Side walls 34 each include an inwardly facing end wall 36 that extends perpendicular to side walls 34. End walls 36 are parallel to first wall 32 and each include an extension 38 extending toward first wall 32. Extensions 38 each include a planar end surface 40 extending parallel to first wall 32 configured to engage a portion of slide 42, as will be described. In some embodiments, all or only a portion of first wall 32, side walls 34, extensions 38 and/or end surfaces 40 may be variously configured and dimensioned, such as, for example, planar, concave, polygonal, irregular, uniform, non-uniform, staggered, tapered, consistent or variable, depending on the requirements of a particular application. In some embodiments, first wall 32, side walls 34, extensions 38 and/or end surfaces 40 may be disposed at alternate orientations, relative to one another and/or longitudinal axis L, such as, for example, parallel, transverse, perpendicular and/or other angular orientations such as acute or obtuse, co-axial and/or may be offset or staggered, depending upon the requirements of a particular application.

Figure 1:
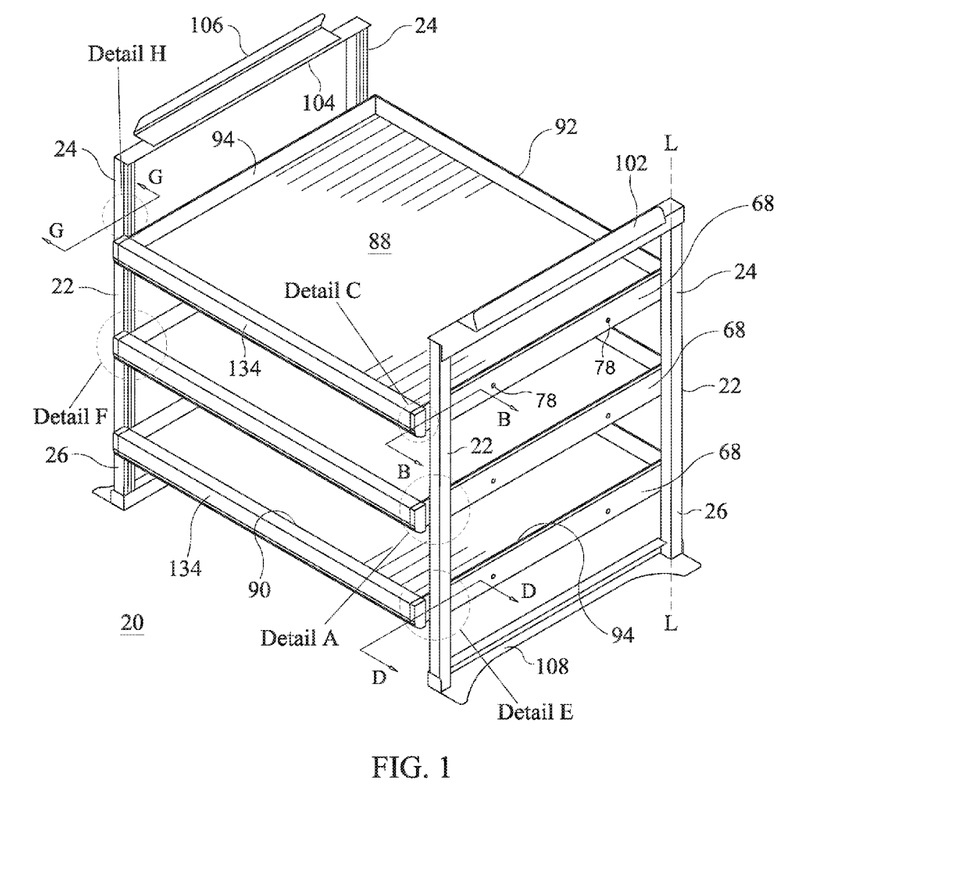
FIG. 1 is a perspective view of one embodiment of a shelving system in accordance with the principles of the present disclosure.
Figure 2:
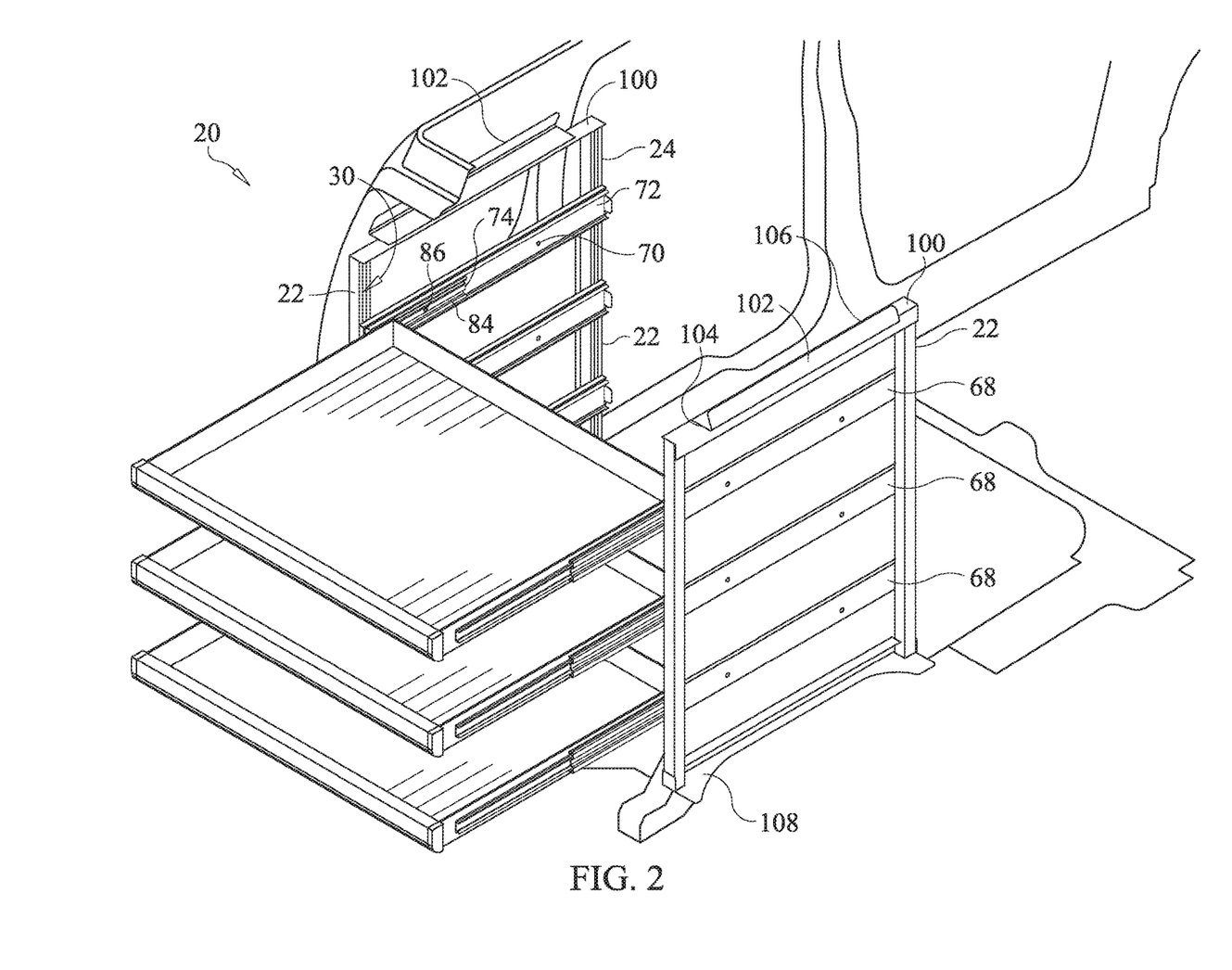
FIG. 2 is a perspective view of one embodiment of a shelving system in accordance with the principles of the present disclosure.
Figure 3:
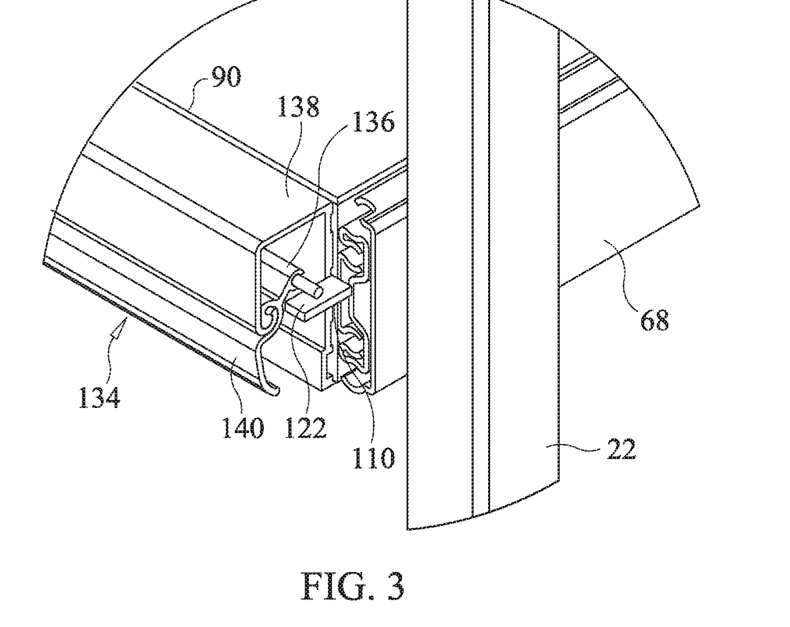
FIG. 3 is a perspective view of the system shown in FIG. 1 at Detail A with components removed.
Figure 4:
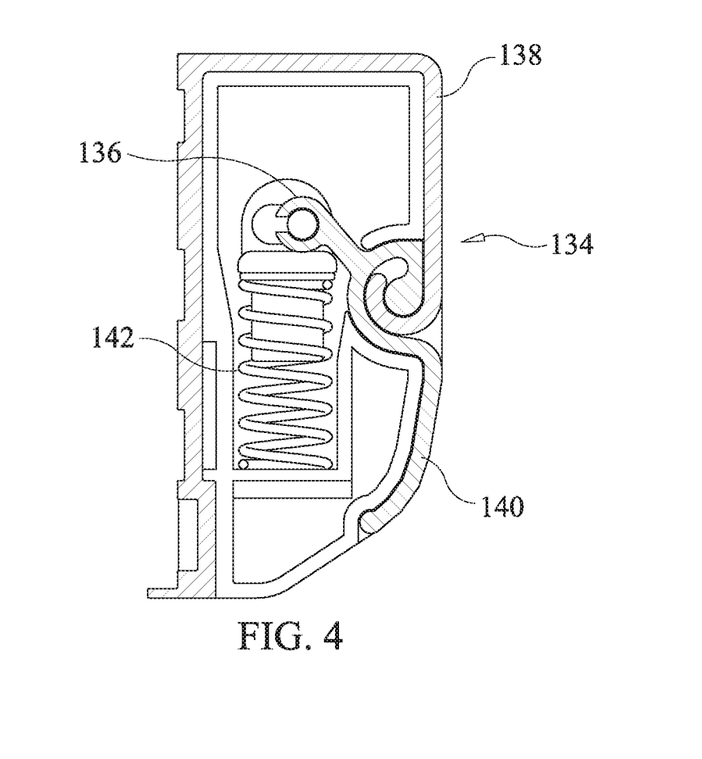
FIG. 4 is a side, cross sectional view of components of the system shown in FIG. 1 along lines B-B at Detail C.

At least one slide 42 is movably disposed in each first channel 30. It is envisioned that system 20 may include one or a plurality of slides 42 disposed in each first channel. As best shown in FIGS. 1 and 2, each first channel 30 includes three slides 42 movably disposed therein. It is envisioned that each of side members 22 includes the same number of slides 42 positioned therein. That is, each side member 22 that makes up the first pair of side members 22 includes the same number of slides as each side member 22 that makes up the second pair of side members 22.

Figure 9:
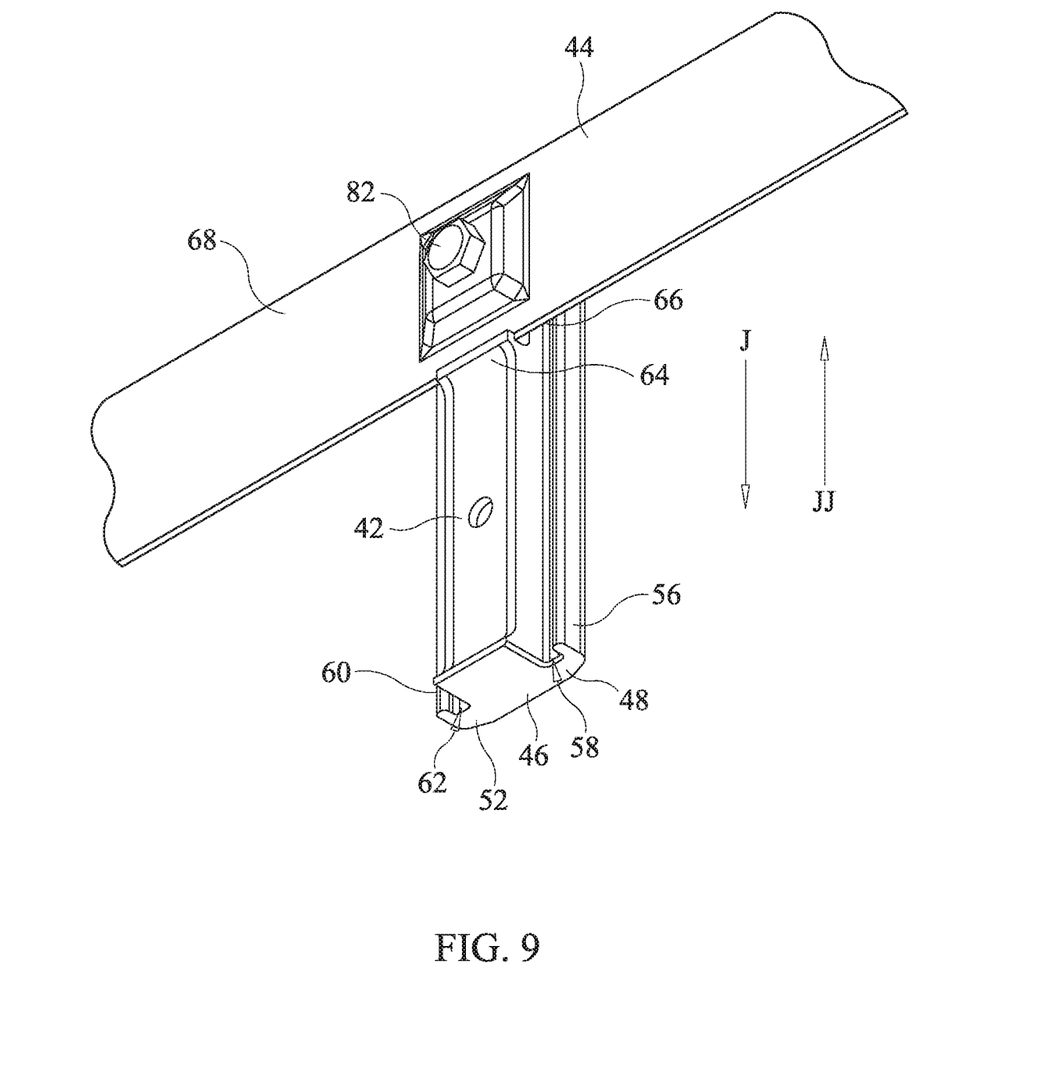
FIG. 9 is a breakaway, perspective view of components of the system shown in FIG. 1 at detail F.
Figure 10:
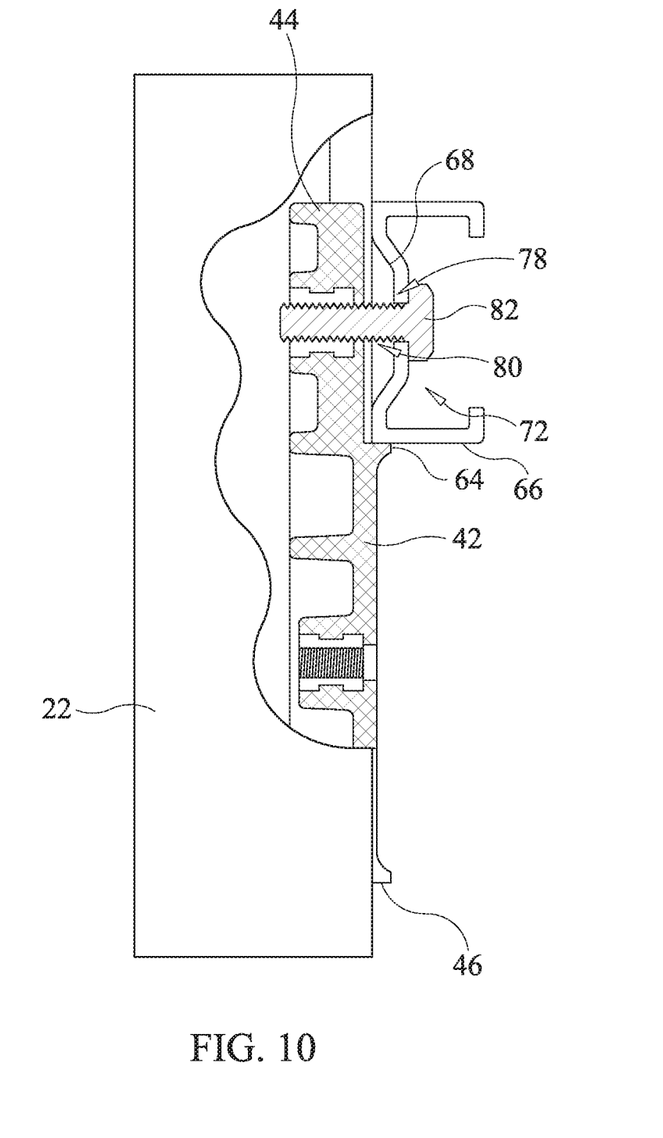
FIG. 10 is a side view, in partial cross section, of components of the system shown in FIG. 1.
Figure 11:
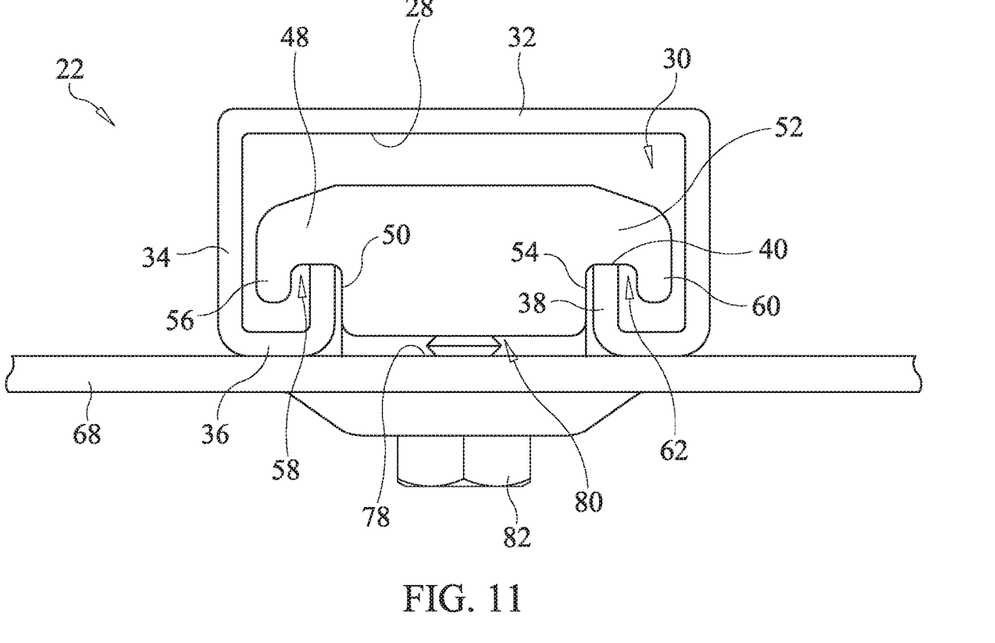
FIG. 11 is a breakaway top, cross sectional view of components of the system shown in FIG. 1 along lines G-G at Detail H.

Slides 42 each include an elongated body extending along longitudinal axis L between a first end 44 and a second end 46, as best shown in FIG. 9. The body of slide 42 includes a first arm 48 extending perpendicular to longitudinal axis L from a first side surface 50 of the body and a second arm 52 extending perpendicular to longitudinal axis L from an opposite second side surface 54 of the body, as best shown in FIG. 11. First arm 48 includes a first wing 56 extending perpendicular to the first arm 48 and defining a first cavity 58. Second arm 52 includes a second wing 60 extending perpendicular to second arm 52 and defining a second cavity 62. First cavity 38 is spaced apart from second cavity 62 by the body of slide 42. One extension 38 of a respective side member 22 is disposed in first cavity 58 and one extension 38 of the respective side member 22 is disposed in second cavity 62 such that slide 42 is movable relative to side member 22 within first channel 30. One end surface 40 is configured to engage first arm 48 and one end surface 40 is configured to engage second arm 52. Slide 42 has a maximum width that is less than a maximum width of first channel 30 such that outer surfaces of first wing 56 and second wing 60 are spaced apart from inner surface 28 when slide 42 is disposed in first channel 30 to allow slide 42 to translate within first channel 30 with minimal resistance. In some embodiments, first arm 48, first side surface 50, second arm 52, second side surface 54, first wing 56, first cavity, second wing 60 and/or second cavity 62 may be disposed at alternate orientations, relative to one another and/or longitudinal axis L, such as, for example, parallel, transverse, perpendicular and/or other angular orientations such as acute or obtuse, co-axial and/or may be offset or staggered, depending upon the requirements of a particular application.

Slides 42 each include a projection 64 extending perpendicular to axis L configured to engage a bottom surface 66 of a cross member 68, as best shown in FIG. 9, to prevent cross member 68 from translating axially relative to slide 42 in the direction shown by arrow J, while allowing cross member 68 to translate axially relative to slide 42 in the direction shown by arrow JJ. One cross member 68 extends between and connects each of the slides 42 positioned in first channels 30 of the first pair of side members 22 and one cross member 68 extends between and connects each of the slides 42 positioned in first channels 30 of the second pair of side members 22. In some embodiments, a plurality of cross members 68 extend between and connect slides 42 positioned in first channels 30 of the first pair of side members and an equal number of cross members 68 extend between and connect slides 42 positioned in first channels 30 of the second pair of side members such that the cross members 68 connecting the first pair of side members 22 are parallel aligned with the cross members 68 connecting the second pair of side members 22.

Cross members 68 each include an inner surface 70 defining a second channel 72 configured for movable disposal of a guide member 74, as will be described. Cross members 68 each include spaced apart threaded openings 78, each of the openings 78 being aligned with a threaded aperture 80 in one of the slides 42. A threaded fastener 82 extends through a respective opening 78 and a respective aperture 80 to fix cross member 68 with slides 42. Fasteners 82 are moveable between a first position in which an outer surface of cross member 68 is spaced apart from outer surfaces of side members 22 and the slides 42 can translate axially within first channels 30 and a second position in which the outer surface of cross member 68 engages the outer surfaces of side members 22 and the slides 42 are fixed relative to side members. When fasteners 82 are in the second position, end walls 36 engage the outer surface of cross member 68 and end surfaces 40 engage arms 48, 52, as best shown in FIG. 11. When fasteners 82 are in the second position, the body of slide 42 is spaced apart from cross member 68. That is, the only portion of each slide 42 that contacts a respective side member 22 and/or cross member 68 is first arm 48 and second arm 52. This configuration allows fasteners 82 to move between the first and second positions by unthreading or threading a respective fastener 82 through a respective opening 78 and a respective aperture 80 only slightly. That is, fastener 82 need only be rotated relative to slide 42 and/or cross member 68 one or a few turns to move fastener 82 from between the first and second positions. When fasteners 82 are in the first position, slides 42 can translate within first channels 30 to adjust the position of slides 42 relative to side members 22. Fasteners 82 are then moved from the first position to the second position to fix the position of slides 42 relative to side members 22.

In some embodiments, side members 22 each include indicia on an outer surface thereof, such as, for example, calibrated lines to measure distances. Such indicia may be used to ensure that four slides 42, each disposed in a first channel 30 of one of the side members 22 that make up the first and second pairs of side members 22 may each be aligned to define a first level. It is envisioned that the indicia may also be used to align other levels of slides 42 before or after aligning the first level.

Each guide member 74 is movably disposed in a second channel 72 and includes an inner surface 84 defining a third channel 86. A drawer, such as, for example, a container 88 includes a first wall 90 and a second wall 92 extending parallel to first wall 90. Container 88 includes a pair of spaced apart side walls 94 extending between first and second walls 90, 92. Outer surfaces of each side wall 94 includes a rail 96. One rail 96 of one container 88 is movably disposed in a third channel 86 of a guide member 74 extending between the first pair of side members 22 and one rail 96 of the container 88 is movably disposed in a third channel 86 of an aligned guide member 74 extending between the second pair of side members 22. Container 88 includes a recessed tray 98 positioned between first and second walls 90, 92 and between the side walls 94. Tray 98 is maintained in a substantially horizontal orientation relative to axis L when container 88 translates within third channel 86 and guide member 74 translates within second channel 72. System 20 may include one or a plurality of containers 88. It is envisioned that the number of containers 88 included corresponds to the number of slides 42 and/or the number of cross members 68 or guide members 74. That is, system 20 includes one container 88 for every four slides 42 and one container 88 for every two cross members 68 or every two guide members 74.

A first upper member 100 extends between and connects first ends 24 of the first pair of first members 22 and a second upper member 100 extends between and connects first ends 24 of the second pair of first members 22. Each upper member 100 includes a bracket 102 having a first surface 104 extending perpendicular to axis L and a second surface 106 disposed at an acute angle relative to first surface 104. In some embodiments, first surface 104 is connected to second surface 106 such that first surface 104 pivots relative to second surface 106 such that second surface 106 can be selectively positioned relative to first surface 104.

In embodiments in which system 20 is configured for mounting in a vehicle such that system 20 is accessible through rear doors of the vehicle, second surface 106 includes one or more openings configured for disposal of a fastener such that the fastener extends through the opening in second surface 106 and into a side wall of the vehicle to fix system 20 relative to the vehicle. It is envisioned that the one or more openings extending through second surface 106 may include threads to facilitate engagement with a fastener. In some embodiments, upper member 100 may be configured to engage the ceiling of a vehicle using bracket 102 described above. In some embodiments, upper member 100 is configured to engage the ceiling of a vehicle and does not include a bracket. Rather, upper member 100 is a single plate that includes one or more openings extending parallel to axis L configured for disposal of a fastener such that the fastener extends through the opening in upper member 100 and into the ceiling of the vehicle to fix system 20 relative to the vehicle. In some embodiments, upper member 100 includes surface configurations to enhance fixation with the interior of the vehicle, such as, for example, rough, arcuate, undulating, porous, semi-porous, dimpled, polished and/or textured according to the requirements of a particular application.

A first lower member 108 extends between and connects second ends 26 of the first pair of first members 22 and a second lower member 108 extends between and connects ends 26 of the second pair of first members 22. Lower members 108 each include a first surface including an aperture 110 extending parallel to axis L configured for disposal of a fastener such that the fastener extends through aperture 110 and into the floor of the vehicle to fix system 20 relative to the vehicle. In some embodiments, aperture 110 is threaded. It is envisioned that lower members 108 may each include one or a plurality of apertures 110. In some embodiments, apertures 110 are uniformly spaced apart from one another.

In some embodiments, rails 96 each include a first locking element 110 positioned adjacent first wall 90 and a second locking element 112 positioned adjacent second wall 92. Locking elements 110, 112 are components of a drawer release. Second locking element 112 is connected to first locking element 110 by a wire, such as, for example, a cable 114. An inner surface 84 of each guide member 74 includes at least one flange 116 configured to engage second locking element 112 to fix container relative to cross member 68 and/or guide member 74. In some embodiments, system 20 includes a first flange 116 adjacent first wall 90 and a second flange that is similar to flange 116 and is spaced apart from the first flange 116 such that the second flange is adjacent second wall 92. In some embodiments, flange 116 extends at an acute angle relative to an axis defined by guide member 74.

First locking element 110 includes a first lever, such as, for example a first knob 118 and a second lever, such as, for example second locking element 112 includes a second knob 120. Cable 114 engages first knob 118 and second knob 120 to connect first locking element 110 with second locking element 112. In some embodiments, cable 114 comprises a rigid material such that the distance between first knob 118 and second knob 120 is fixed. In some embodiments, a first end of cable 114 defines a hook that engages first knob 118 and a second end of cable 114 defines a hook that engages second knob 120, the hooks being oriented in opposite directions. That is, the hook that engages first knob 118 has an opening oriented in a direction that is opposite the direction in which the opening of the hook that engages second knob 120 is oriented. In some embodiments, cable 114 applies tension between first knob 118 and second knob 120. A first end 122 of first locking element 110 pivots relative to a second end 124 of first locking element 110 about a pivot point 126 positioned between first knob 118 and first wall 90. A first end 128 of second locking element 112 pivots relative to a second end 130 of second locking element 112 about a pivot point 132 positioned between second knob 120 and first wall 90.

Figure 7:
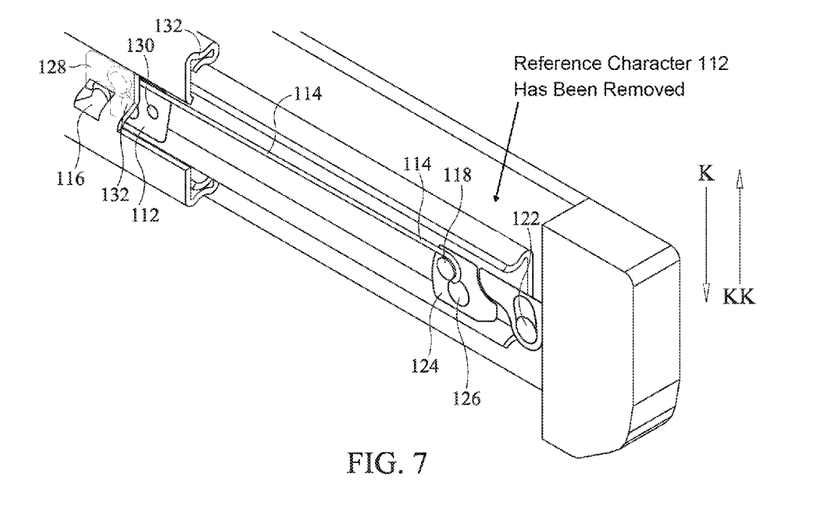
FIG. 7 is a perspective view of components of the system shown in FIG. 1, with components of the system in a first position.
Figure 8:
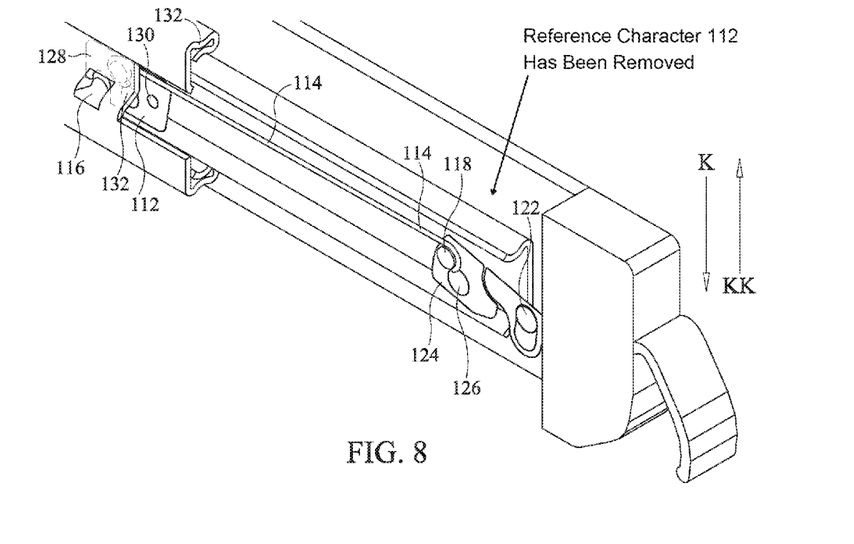
FIG. 8 is a perspective view of components of the system shown in FIG. 1, with components of the system in a second position.

First wall 90 includes a handle 134 including a third locking element 136 that is part of the drawer release and engages first end 122 of first locking element 110. First wall 90 has a length extending between side walls 94, 94. Handle 134 extends between side walls 94, 94 such that handle 134 has a length that is equal to the length of first wall 90. Handle 134 is movable between a first position in which first end 128 of second locking element 112 engages flange 116 of guide member 74 and container 88 is fixed relative to guide member 74, as shown in FIG. 7, and a second position in which first end 128 of second locking element 112 is spaced apart from flange 116 and container 88 can translate relative to guide member 74. as shown in FIG. 8.

Handle 134 includes a first portion 138 and a second portion 140 that movably engages first portion 138. Second portion 140 includes third locking element 136. Third locking element 136 includes a pin that extends perpendicular to axis L. A pulling motion applied to second portion 140 moves second portion 140 from a first orientation, shown in FIG. 7, to a second orientation, shown in FIG. 8, and moves handle 134 from the first position to the second position. In some embodiments, handle 134 is biased to the first position by a spring 142 that engages third locking element 136. Moving second portion 140 of handle 134 from the first orientation to the second orientation moves third locking element 136 in a downward direction, such as, for example, the direction shown by arrow K, such that second end 124 of first locking element 110 moves in an opposite, upward direction such as, for example, the direction shown by arrow KK. First end 128 of second locking element 112 moves in the upward direction when second end 124 of first locking element 110 moves in the upward direction.

Figure 5:
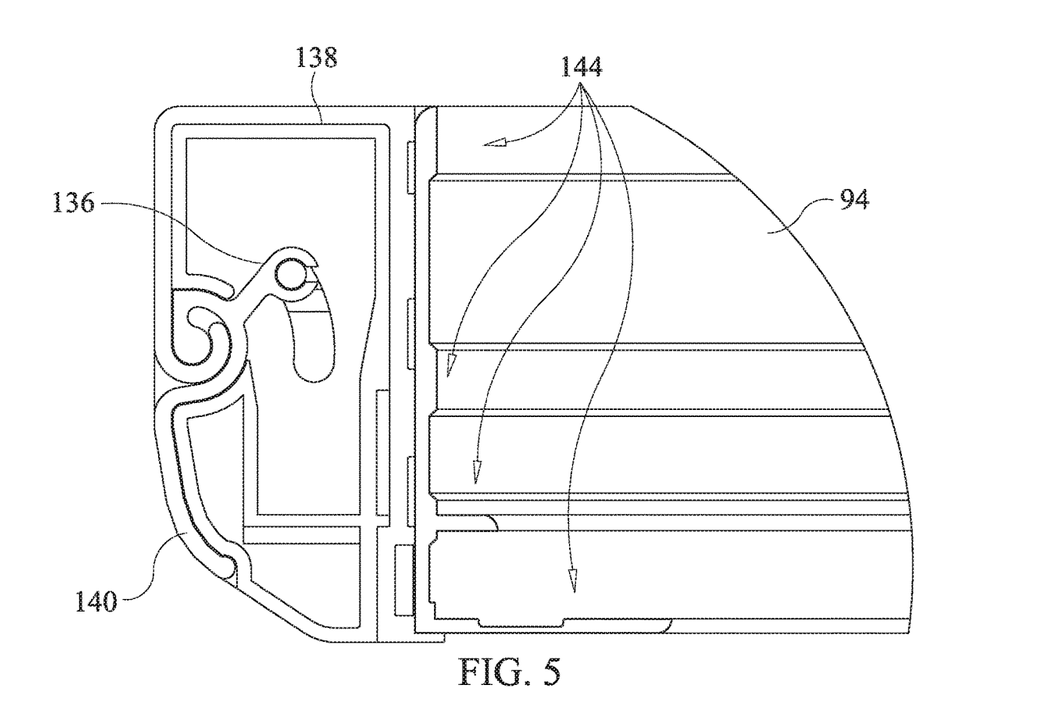
FIG. 5 is a side, cross sectional view of components of the system shown in FIG. 1 along lines D-D at Detail E.
Figure 6:
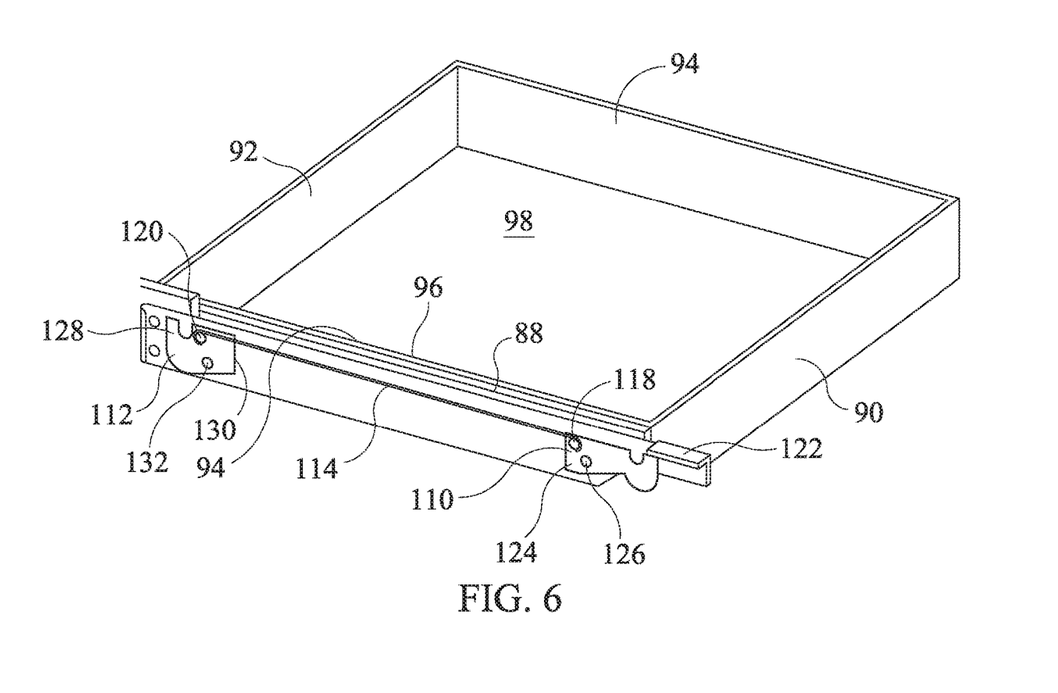
FIG. 6 is a perspective view of components of the system shown in FIG. 1.

Side walls 94, 94 of container 88 each include an inner surface defining a plurality of spaced apart recesses 144 extending parallel to one another and first wall 90 includes a plurality of spaced apart protuberances 146 each extending parallel to one another that are disposed in recesses 144 to engage first wall 90 with side walls 94, 94. As shown in FIG. 5, protuberances 146 may have varying lengths. In some embodiments, the lengths of protuberances 146 increases from the top of first wall 90 to the bottom of first wall 90. In some embodiments, this configuration is reversed. That is, the lengths of protuberances 146 decreases from the top of first wall 90 to the bottom of first wall 90. In some embodiments, the upper most protuberance 146 and the lower most protuberance 146 each have a length that is less than a protuberance 146 positioned between the upper most protuberance 146 and the lower most protuberance 146. In some embodiments, each of the protuberances 146 has a length that is substantially equivalent.

In some embodiments, system 20 includes a vehicle 200, such as, for example, a van, truck or car having at least one first side door 202 and at least one second side door 204 opposite first side door 202. It is envisioned that the at least one first side door 202 may include a pair of first side doors 202 that open independently of one another. It is envisioned that vehicle 200 may lack a post or other support means between the pair of first side doors 202 such that an interior of vehicle 200 has an open configuration adjacent the pair of first side doors 202. It is envisioned that the at least one second side door 204 may include a pair of second side doors 204 that open independently of one another. It is envisioned that vehicle 200 may lack a post or other support means between the pair of second side doors 204 such that the interior of vehicle 200 has an open configuration adjacent the pair of second side doors 204. Vehicle 200 includes a partition 206 positioned between the pair of first side doors 202 and the pair of side doors 204. Partition 206 is fixed relative to vehicle 200 and extends substantially parallel to side doors 202, 204 when side doors 202, 204 are in a closed position. That is, partition 206 extends parallel to an axis defined by vehicle 200. It is envisioned that partition 206 may extend from a floor of vehicle 200 to a ceiling of vehicle 200. In some embodiments, partition 206 is removable. In some embodiments, partition 206 integrally formed with the floor and/or ceiling of the vehicle.

Figure 12:
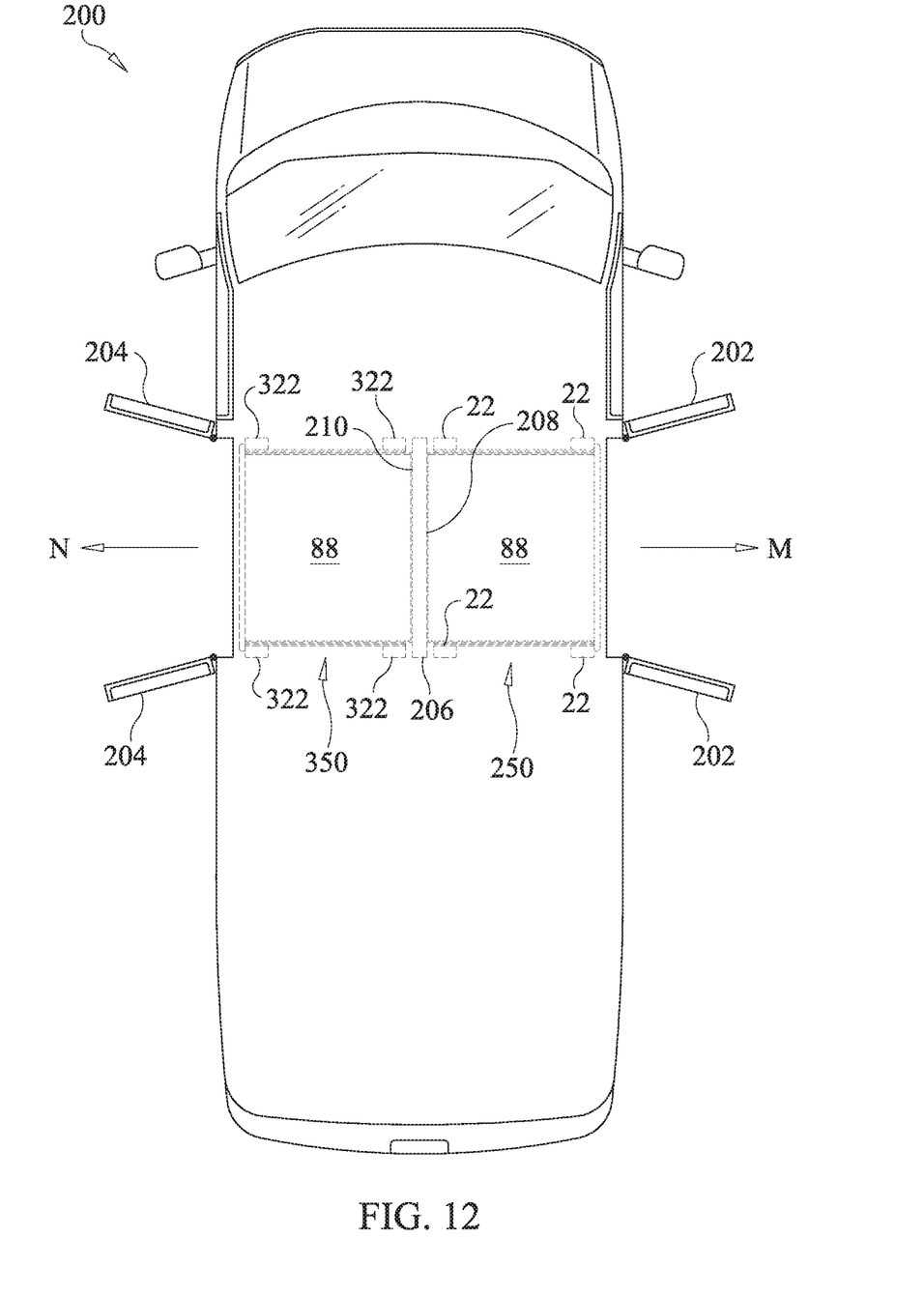
FIG. 12 is a top, cross sectional view of the system shown in FIG. 1 positioned in a vehicle, wherein the vehicle includes a second shelving system in accordance with the principles of the present disclosure, and wherein the system shown in FIG. 1 and the second system have drawers in a closed position.

First and second side members 22, 22 are positioned in the interior of vehicle 200 such that first and second side members 22, 22 extend perpendicular to partition 206. One of first and second side members 22, 22 engages a first surface 208 of partition 206. Slides 42, cross members 68, guide members 74, containers 88, upper members 100 and lower members 108 are positioned relative to side members 22 and/or one another in the manner described above to define a first shelving unit 250, as best shown in FIGS. 12 and 13.

In some embodiments, system 20 includes a second shelving unit 350 comprising third and fourth side members 322 each having a configuration similar to side members 22, 22. Third and fourth side members 322, 322 include an inner surface defining a fourth channel. Third and fourth side members 322, 322 are being positioned in the interior of vehicle 200 such that third and fourth side members 322, 322 extend perpendicular to partition 206. One of third and fourth side members 322, 322 engage a second surface 210 of partition 206 that is opposite first surface 208. A second slide 42 is movably disposed in each fourth channel of third and fourth side members 322, 322. The fourth channels each have a configuration similar to first channels 30. A second cross member 68 extends between and connects the second slides 42. A second guide 74 is movably disposed in second channel 72 of second cross member 68. A rail 96 of a second container 88 is movably disposed in third channel 86 of second cross member 68.

Figure 13:
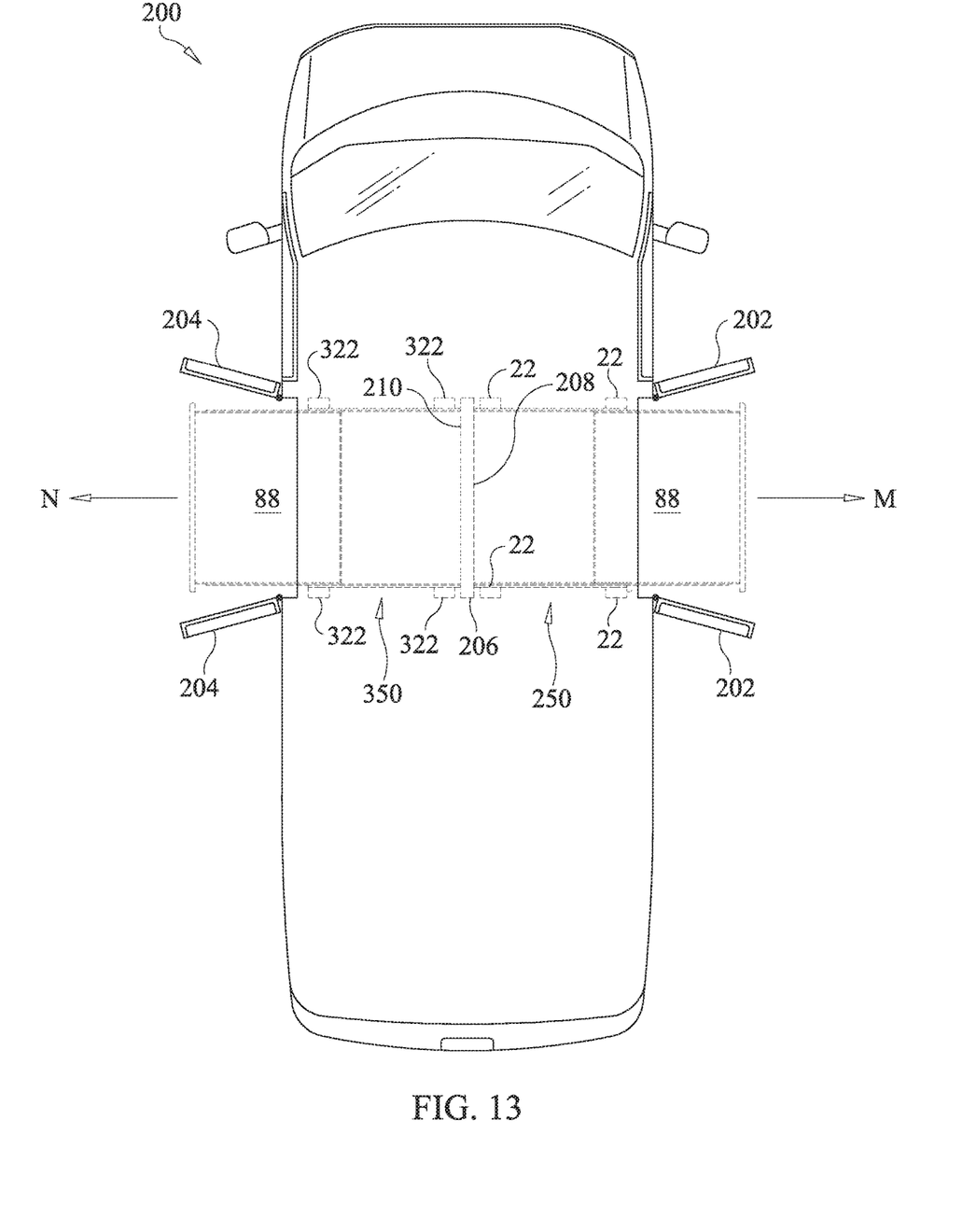
FIG. 13 is a top, cross sectional view of the system shown in FIG. 1 and the second system shown in FIG. 12 positioned in a vehicle, wherein the system shown in FIG. 1 and the second system shown in FIG. 12 have drawers in an open position.

Container 88 of first shelving unit 250 and second container 88 of second shelving unit 350 open in opposing directions, as best shown in FIG. 13. That is, container 88 opens by moving container 88 relative to vehicle 200 in the direction shown by arrow M and closes by moving container 88 relative to vehicle 200 in the direction shown by arrow N. Conversely, container 388 opens by moving container 388 relative to vehicle 200 in the direction shown by arrow N and closes by moving container 388 relative to vehicle 200 in the direction shown by arrow M.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:
1. A drawer release comprising:
    a drawer slide including a first locking element; and
    a drawer coupled to the drawer slide, the drawer including a frame, a second locking element coupled to the frame and a handle coupled to the frame,
    wherein a pulling motion applied to the handle causes the second locking element to rotate relative to the frame to move the drawer release between a first orientation in which the second locking element engages the first locking element to prevent sliding movement of the drawer relative to the drawer slide and a second orientation in which the second locking element is spaced apart from the first locking element to allow sliding movement of the drawer relative to the drawer slide.
2. The drawer release recited in claim 1, wherein the handle includes a third locking element that engages a portion of the second locking element as the drawer release moves between the first and second orientations.
3. The drawer release as recited in claim 2, wherein a first portion of the handle includes a channel, a second portion of the handle having a first end rotatably positioned in the channel and an opposite second end that engages the second locking element.
4. The drawer release as recited in claim 3, wherein the second end defines the third locking element.
5. The drawer release as recited in claim 4, wherein the third locking element engages a portion of the second locking element as the drawer release moves between the first and second orientations.
6. The drawer release as recited in claim 3, wherein the second end engages a portion of the second locking element as the drawer release moves between the first and second orientations.
7. The drawer release as recited in claim 1, wherein the handle includes a third locking element that moves vertically to move the drawer release from the first orientation to the second orientation.
8. The drawer release as recited in claim 1, wherein the handle includes a third locking element that engages a top surface of a portion of the second locking element and pushes the portion of the second locking element downwardly to move the drawer release from the first orientation to the second orientation.
9. The drawer release as recited in claim 1, wherein the drawer slide defines a channel, the drawer including a rail coupled to the side of the frame, the rail being positioned in the channel, the second locking element being coupled to the rail.

10. The drawer release as recited in claim 1, wherein the drawer slide includes opposite inner and outer surfaces, the inner surface defining a channel, the drawer including a rail coupled to the side of the frame, the rail being positioned in the channel, the first locking element including a flange that extends into the channel.

11. The drawer release as recited in claim 10, wherein the outer surface defines a top surface of the flange and the inner surface defines an opposite bottom surface of the flange.

12. The drawer release as recited in claim 1, wherein the drawer release is biased to the first orientation.

13. The drawer release as recited in claim 1, wherein the handle includes a third locking element and the drawer release is biased to the first orientation by a spring that engages the third locking element.

14. The drawer release as recited in claim 1, wherein the second locking element includes a first lever and a second lever that is coupled to the first lever.

15. The drawer release as recited in claim 14, wherein the first lever is coupled to the second lever by a wire.

16. The drawer release as recited in claim 14, wherein the third locking element engages the first lever and the second lever engages the first locking element when the drawer release is in the first orientation.

17. A drawer release as recited in claim 14, wherein rotation of the first lever causes the second lever to rotate.

18. The drawer release as recited in claim 1, wherein the first locking element is a flange and the second locking element is a lever.

19. A drawer release comprising:
a member including a first locking element; and
a drawer coupled to the member, the drawer including a frame, a second locking element coupled to the frame and a handle coupled to the frame, the handle comprising a first portion and a second portion,
wherein rotating the second portion relative to the first portion causes the second locking element to rotate relative to the frame to move the drawer release between a first orientation in which the second locking element engages the first locking element to prevent sliding movement of the drawer relative to the member and a second orientation in which the second locking element is spaced apart from the first locking element to allow sliding movement of the drawer relative to the member.

20. A drawer release comprising:
a member including a flange; and
a drawer coupled to the member, the drawer including a frame, a locking element coupled to the frame and a handle coupled to the frame, the handle comprising a first portion and a second portion,
wherein rotating the second portion relative to the first portion causes the locking element to rotate relative to the frame to move the drawer release between a first orientation in which the locking element engages the flange to prevent sliding of the drawer relative to the member and a second orientation in which the locking element is spaced apart from the flange to allow sliding movement of the drawer relative to the member.

* * * * *